United States Patent
Ohashi

(10) Patent No.: US 8,866,773 B2
(45) Date of Patent: Oct. 21, 2014

(54) REMOTE CONTROL APPARATUS, REMOTE CONTROL SYSTEM, REMOTE CONTROL METHOD, AND PROGRAM

(75) Inventor: Yoshinori Ohashi, Tokyo (JP)

(73) Assignee: Sony Corporation (JP)

(*) Notice: Subject to any disclaimer, the term of this patent is extended or adjusted under 35 U.S.C. 154(b) by 127 days.

(21) Appl. No.: 13/510,111

(22) PCT Filed: Nov. 2, 2010

(86) PCT No.: PCT/JP2010/069466
§ 371 (c)(1),
(2), (4) Date: May 16, 2012

(87) PCT Pub. No.: WO2011/068004
PCT Pub. Date: Jun. 9, 2011

(65) Prior Publication Data
US 2012/0229410 A1 Sep. 13, 2012

(30) Foreign Application Priority Data
Dec. 2, 2009 (JP) ................................. 2009-274913

(51) Int. Cl.
 G06F 3/041 (2006.01)
 G06F 3/0488 (2013.01)
 H04N 21/422 (2011.01)
(52) U.S. Cl.
 CPC ...... *G06F 3/04883* (2013.01); *H04N 21/42224* (2013.01); *G08C 2201/30* (2013.01)
 USPC ........... 345/173; 345/156; 345/163; 345/174; 348/734; 715/862

(58) Field of Classification Search
 USPC ............... 345/173–183, 156–167; 178/18.01, 178/18.03
 See application file for complete search history.

(56) References Cited

U.S. PATENT DOCUMENTS

| 7,109,975 B2* | 9/2006 | Fedorak et al. ............... 345/173 |
| 7,324,087 B2* | 1/2008 | Iijima ........................... 345/157 |
| 7,782,309 B2* | 8/2010 | Janik ............................. 345/173 |
| 2008/0316183 A1* | 12/2008 | Westerman et al. .......... 345/173 |

FOREIGN PATENT DOCUMENTS

| JP | 2004-062503 A | 2/2004 |
| JP | 2005-04994 A | 2/2005 |
| JP | 2008-191791 A | 8/2008 |

* cited by examiner

*Primary Examiner* — Kevin M Nguyen
*Assistant Examiner* — Kenneth B Lee, Jr.
(74) *Attorney, Agent, or Firm* — Lerner, David, Littenberg, Krumholz & Mentlik, LLP

(57) ABSTRACT

Provided is a remote control apparatus which includes a display panel, a control detecting part for detecting a swipe of a contact point by a continuous contact control to the display panel, a command generating part for finding a first direction from a positional relationship between a contact starting point and a first swipe point swiped from the contact starting point, generating a control command indicating start of a swipe in the first direction, finding a second direction from a positional relationship between the contact starting point and a second swipe point swiped from the first swipe point, and generating a control command indicating stop of the swipe in the first direction and start of a swipe in the second direction in the case where the second direction differs from the first direction, and a command transmitting part for transmitting the generated control command to a television.

9 Claims, 11 Drawing Sheets

FIG.5

| CATEGORY | DESCRIPTION |
|---|---|
| KEY CODE | "UP", "DOWN", "RIGHT", AND "LEFT" : INDICATE DIRECTION DESIGNATED AS SWIPE DIRECTION |
| CONTROL CODE | "START" : INDICATE START OF SWIPE ACCORDING TO KEY CODE<br>"STOP" : INDICATE STOP OF SWIPE ACCORDING TO KEY CODE<br>"CONTINUATION" : INDICATE CONTINUATION OF SWIPE ACCORDING TO KEY CODE |
| STRENGTH PARAMETER | INDICATE SWIPE SPEED, ACCELERATION OR THE LIKE ACCORDING TO KEY CODE |

REMOTE CONTROL APPARATUS, REMOTE CONTROL SYSTEM, REMOTE CONTROL METHOD, AND PROGRAM

CROSS-REFERENCE TO RELATED APPLICATION

The present application is a national phase entry under 35 U.S.C. §371 of International Application No. PCT/JP2010/069466 filed Nov. 2, 2010, published on Jun. 9, 2011 as WO 2011/068004 A1, which claims priority from Japanese Patent Application No. JP 2009-274913 filed in the Japanese Patent Office on Dec. 2, 2009.

TECHNICAL FIELD

The present invention relates to a remote control apparatus, a remote control system, a remote control method, and a program.

BACKGROUND ART

In recent years, a remote control apparatus such as a commander mounted with a touch panel display has been spreading. The remote control apparatus is configured to remotely control an electronic device such as a television. Also, a remote control apparatus is known that detects a swipe and hold control designating an arbitrary contact starting point on the touch panel provided on a touch panel display and transmits a control command according to the detected result to the electronic device.

In this case, the swipe and hold control designating an arbitrary contact starting point denotes a control in which a finger or the like touches an arbitrary point in the contact detecting region of the touch panel, and the finger or the like is swiped while touching the touch panel and then is held on the touch panel while touching the touch panel. The swipe and hold control designating an arbitrary contact starting point enables the user's control without checking the display on the touch panel. Thus, the user can concentrate on watching and listening to the content or the like displayed on the electronic device.

The remote control apparatus transmits, to the electronic device in response to the swipe control, a control command indicating start of the swipe in a direction corresponding to the control direction. The remote control apparatus then transmits a control command indicating stop of the swipe in response to the cancellation of the hold control after the swipe control. Meanwhile, the electronic device, for example, moves the cursor and switches the display of the content on the display in response to the received control command.

SUMMARY OF INVENTION

Technical Problem

However, to change the swipe direction in the swipe and hold control in the past, a swipe and hold control in a second direction needs to follow a temporary cancellation of the contact by a finger or the like to the touch panel after the swipe and hold control in a first direction. Similarly, to stop the swipe, the contact by a finger or the like to the touch panel needs to be canceled after the swipe and hold control in the first direction.

Thus, the cancellation of the contact loses the continuity of the control. A cancellation of the contact at an improper time also fails to input a desired command. This sometimes decreases the operability.

In view of the foregoing, the present invention provides a remote control apparatus, a remote control system, a remote control method, and a program, capable of increasing the operability of a swipe and hold control.

Solution to Problem

According to the first aspect of the present invention in order to achieve the above-mentioned object, there is provided a remote control apparatus including: a display panel; a control detecting part for detecting a swipe of a contact point by a continuous contact control to the display panel; a command generating part for finding a first direction from a positional relationship between a contact starting point and a first swipe point swiped from the contact starting point, generating a control command indicating start of a swipe in the first direction, finding a second direction from a positional relationship between the contact starting point and a second swipe point swiped from the first swipe point, and generating a control command indicating stop of the swipe in the first direction and start of a swipe in the second direction in the case where the second direction differs from the first direction; and a command transmitting part for transmitting the generated control command to an electronic device.

According to the above configuration, the first direction is found from the positional relationship between the contact starting point and the first swipe point, and the control command indicating start of the swipe in the first direction is transmitted. The second direction is found from the positional relationship between the contact starting point and the second swipe point and the control command indicating stop of the swipe in the first direction and start of a swipe in the second direction is transmitted in the case where the second direction differs from the first direction. Therefore, the swipe direction can be changed without a temporary cancellation of the contact so that the operability of the swipe and hold control can be increased.

The command generating part may find a first distance between the contact starting point and the first swipe point and a second distance between the contact starting point and the second swipe point, and generate a control command indicating stop of a swipe in the case where a difference between the first distance and the second distance is equal to or larger than a predetermined threshold.

The command generating part may find a distance between the contact starting point and a swipe point, and generate the control command indicating start of the swipe in the case where the found distance is equal to or larger than another predetermined threshold.

The command generating part may generate a control command indicating continuation of the swipe until the control command indicating stop of the swipe is transmitted after the control command indicating start of the swipe is transmitted.

The command generating part may generate the control command indicating stop of the swipe in the case where a contact point is not detected after the control command indicating start of the swipe is transmitted to the electronic device.

The control command may include information set according to the distance between the contact starting point and the swipe point and indicating a swipe speed.

The control command may be used for swiping an object to be swiped displayed on the electronic device.

According to the second aspect of the present invention in order to achieve the above-mentioned object, there is provided a remote control system including the above-mentioned remote control apparatus and an electronic device that is remotely controlled by the remote control apparatus.

According to the third aspect of the present invention in order to achieve the above-mentioned object, there is provided a remote control method including: detecting a swipe of a contact point by a continuous contact control to a display panel; finding a first direction from a positional relationship between a contact starting point and a first swipe point swiped from the contact starting point, generating and transmitting, to an electronic device, a control command indicating start of a swipe in the first direction; and finding a second direction from a positional relationship between the contact starting point and a second swipe point swiped from the first swipe point, generating and transmitting, to the electronic device, a control command indicating stop of the swipe in the first direction and start of a swipe in the second direction in the case where the second direction differs from the first direction.

According to the fourth aspect of the present invention in order to achieve the above-mentioned object, there is provided a program for causing a computer to implement the above-mentioned remote control method. In this case, the program can be provided using a computer readable recording medium or provided through a communication method.

Advantageous Effects of Invention

According to the present invention, as described above, a remote control apparatus, a remote control system, a remote control method, and a program, capable of increasing the operability of a swipe and hold control can be provided.

BRIEF DESCRIPTION OF DRAWINGS

FIG. 5 is a table showing control commands generated in response to a swipe and hold control.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[1. Outline of Remote Control Apparatus 100]

Figure 1:
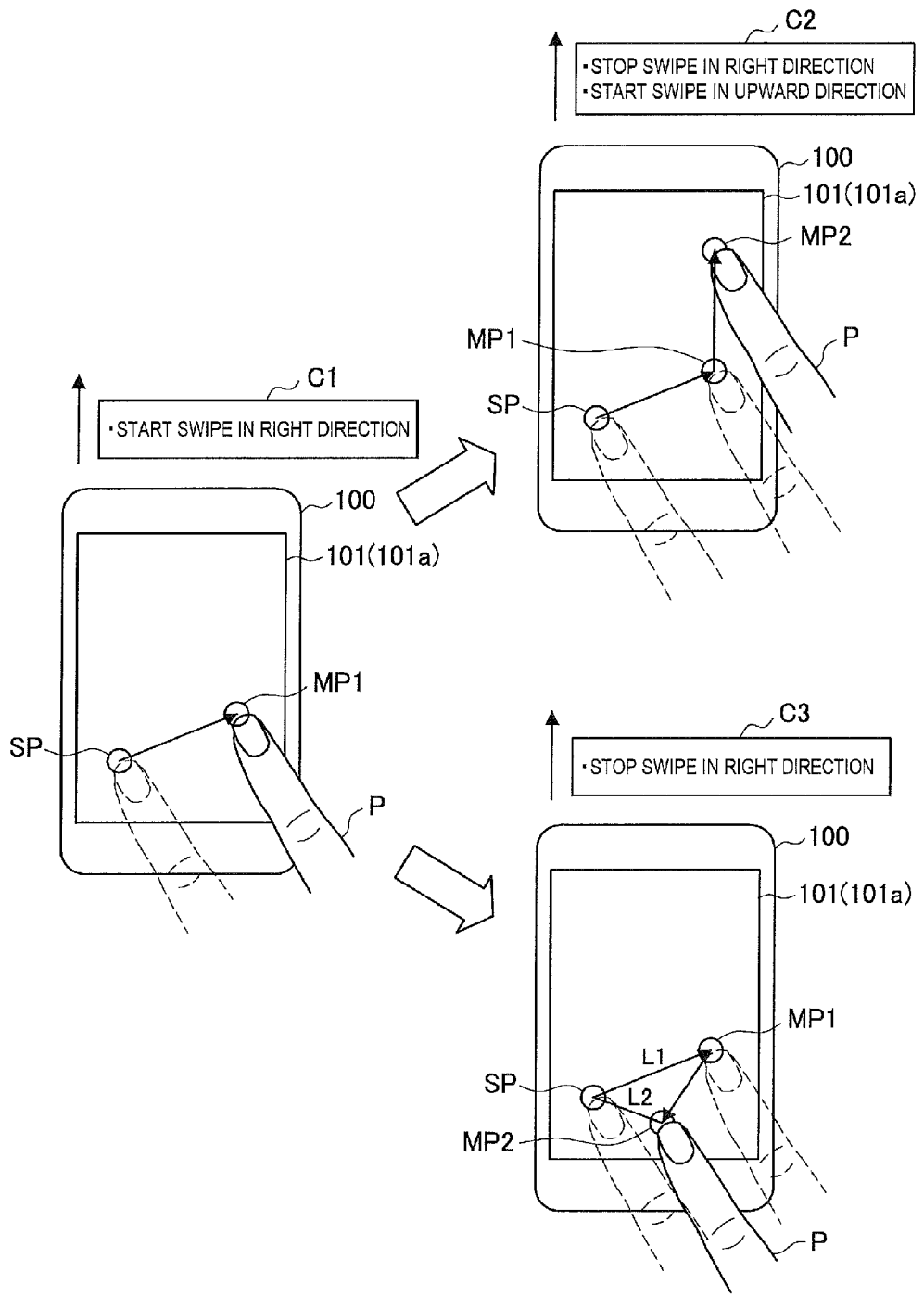
FIG. 1 is a schematic illustration of a remote control apparatus according to an embodiment of the present invention.

First, the outline of a remote control apparatus 100 according to an embodiment of the present invention will be described with reference to FIG. 1. FIG. 1 is a schematic illustration of the remote control apparatus 100 according to an embodiment of the present invention.

As shown in FIG. 1, a swipe and hold control in which an arbitrary contact starting point SP has been designated by a finger P or the like is conducted on a touch panel 101a provided at a touch panel display 101 in the remote control apparatus 100. A continuous control such as a control from the contact starting point SP to a first swipe point MP1, to a second swipe point MP2 . . . is done in the swipe and hold control while maintaining the contact.

Then, a first direction (e.g., right direction) is found from the positional relationship between the contact starting point SP and the first swipe point MP1 and a control command C1 indicating start of the swipe in the first direction is transmitted to an electronic device (not shown). Further, a second direction (e.g., upper direction) is found from the positional relationship between the contact starting point SP and the second swipe point MP2. When the second direction differs from the first direction, a control command C2 indicating stop of the swipe in the first direction and start of the swipe in the second direction is transmitted to the electronic device. Accordingly, the change of the swipe direction can be instructed as the continuity of the control is maintained.

Furthermore, a first distance L1 between the contact starting point SP and the first swipe point MP1 and a second distance L2 between the contact starting point SP and the second swipe point MP2 are found in the remote control apparatus 100. When a difference ΔL between the first distance L1 and the second distance L2 is equal to or larger than a predetermined threshold LT, a control command C3 indicating stop of the swipe is transmitted to the electronic device. Accordingly, the stop of the swipe can be instructed as the continuity of the control is maintained.

[2. Configuration of Remote Control Apparatus 100]

Figure 2:
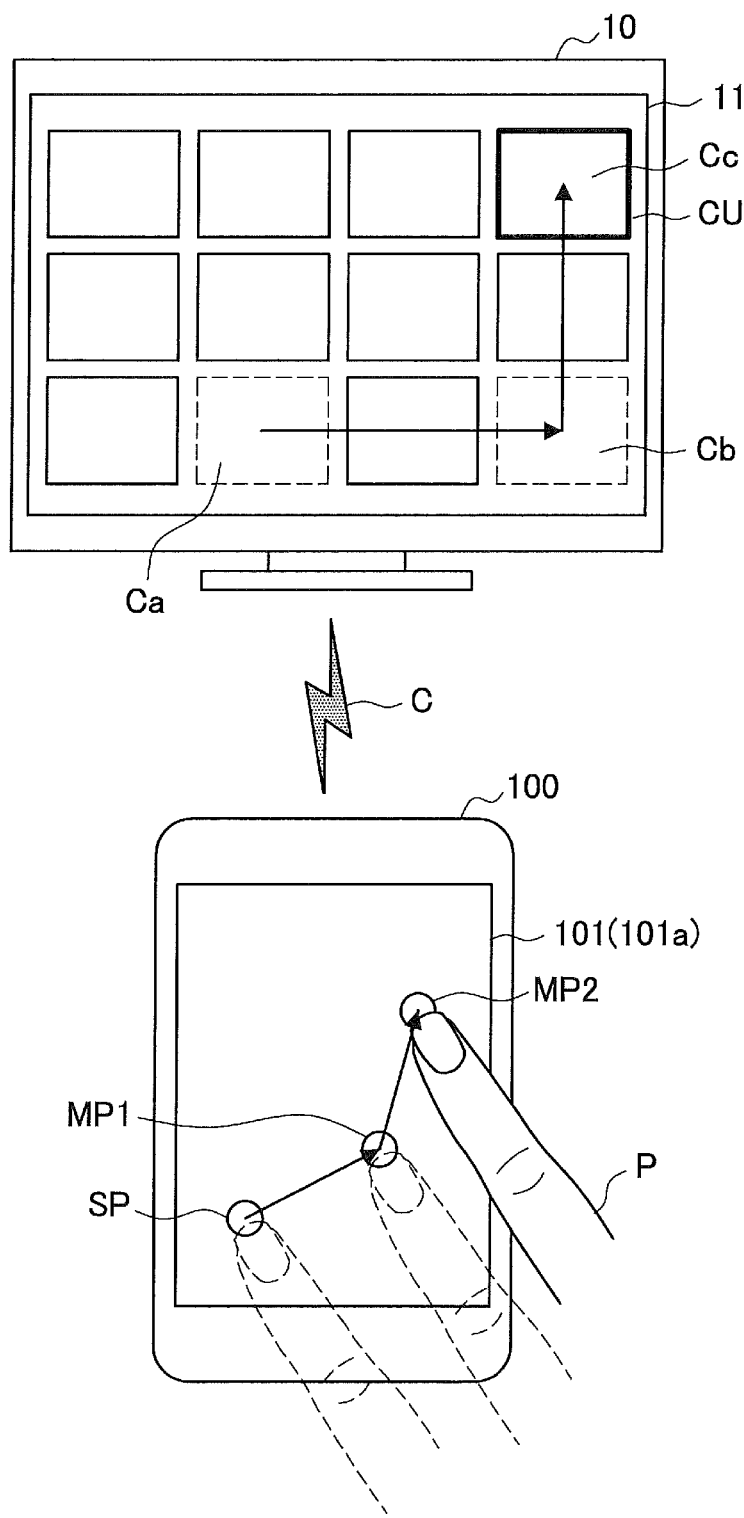
FIG. 2 is an illustration of a configuration of a remote control system according to an embodiment of the present invention.
Figure 3:
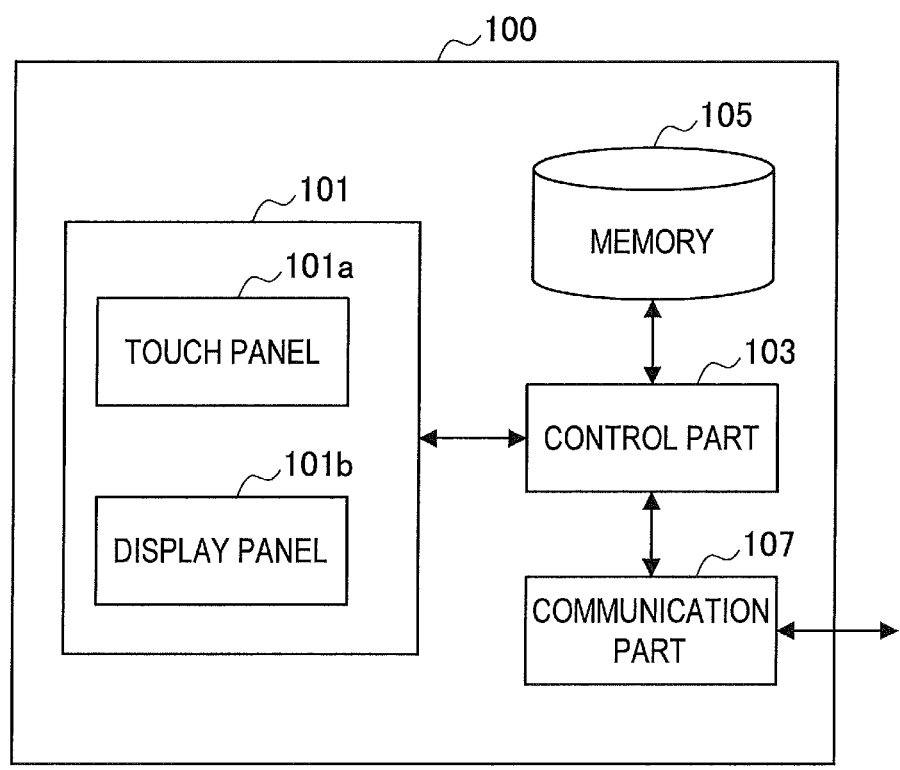
FIG. 3 is a block diagram showing a main configuration of a commander according to an embodiment of the present invention.

Next, the configuration of the remote control apparatus 100 according to an embodiment of the present invention will be described with reference to FIGS. 2 and 3. FIG. 2 is an illustration of a configuration of a remote control system according to an embodiment of the present invention. FIG. 3 is a block diagram showing a main configuration of a commander 100 according to an embodiment of the present invention. Note that hereinafter the description will be given, assuming the remote control apparatus 100 as the commander 100 including the touch panel display 101.

As shown in FIG. 2, the commander 100 constitutes a part of a remote control system that remotely controls an electronic device such as a television 10. The commander 100 is an example of an electronic device that has the touch panel display 101, such as a PDA, a mobile phone, or a digital music player. The television 10 is an example of an electronic device that is remotely controlled by the user using the commander 100.

The commander 100 performs a unidirectional communication or a mutual communication to the television 10 without a network, or through a wired or wireless network. The commander 100 transmits, to the television 10, a control command C in response to a contact control by the finger P or the like of the user to the touch panel 101a provided at the touch panel display 101.

In this case, the commander 100 detects the swipe and hold control in which an arbitrary contact starting point SP has been designated on the touch panel 101a and then transmits the control command C according to the detected result to the television 10. The television 10, for example, moves a cursor CU and switches the display of the content on a display 11 in response to the received control command C.

In the example shown in FIG. 2, after a first control for swiping the finger P from the contact starting point SP to the first swipe point MP1 and holding it, a second control for swiping the finger P from the first swipe point MP1 to the second swipe point MP2 and holding it is performed without canceling the contact on the touch panel 101a. Thus, on the display 11, the cursor CU is moved from a content Ca to a content Cb in response to the first control and is moved from the content Cb to a content Cc in response to the second control.

As shown in FIG. 3, the commander 100 includes the touch panel display 101, a control part 103, a memory 105, and a communication part 107.

The touch panel display 101 includes the touch panel 101a (control detecting part) and a display panel 101b stacked thereon. For example, a resistive, capacitance, ultrasonic, or infrared panel is used as the touch panel 101a. For example, a liquid crystal display (LCD) is used as the display panel 101b.

The touch panel 101a detects a contact with a panel surface by the finger P, a stylus or the like. The touch panel 101a supplies the control part 103 with a contact signal when the finger P comes into contact with the panel surface, and supplies the control part 103 with a cancel signal when the finger P separates from the panel surface. Further, the touch panel 101a supplies the control part 103 with a coordinate signal indicating a X-Y coordinate according to the contact position while the finger P is in contact with the panel surface.

The control part 103 includes a CPU, a RAM, a ROM or the like. The CPU uses the RAM as a working memory to execute a program stored in the ROM and to control each part of the commander 100. The control part 103 also functions as a command generating part and a command transmitting part by executing a program.

The memory 105 is a non-volatile memory such as an EEPROM and stores display data, command information and the like. The communication part 107 transmits a predetermined control command C to the television 10 according to the control input by the user.

The control part 103 decodes the coordinate signal supplied from the touch panel 101a to generate coordinate data and controls each part of the commander 100 based on a contact/cancel signal and the coordinate data. The control part 103 reads command information from the memory 105 and supplies the command information to the communication part 107 according to the control input by the user. The communication part 107 transmits a predetermined control command C to the television 10 based on the command information. The control part 103 reads data stored in the memory 105 to generate display data for a graphical user interface (GUI) screen and supplies the display data to the display panel 101b. The display panel 101b displays the GUI screen based on the display data.

The control part 103 determines the swipe and hold control that has designated a given contact starting point SP, based on the contact/cancel signal and the coordinate data.

Upon the first input of a contact signal after the input of a cancel signal, the control part 103 sets the corresponding coordinate data as the coordinate of the contact starting point SP. The control part 103 determines that a swipe control has been done when recognizing that the coordinate data continuously change while a contact signal is continuously input.

After determining that a swipe control has been done, the control part 103 determines that a hold control has been done when recognizing almost-constant coordinate data while a contact signal is continuously input and then sets the coordinate data as the coordinate of a swipe point MP. The control part 103 determines that the swipe and hold control has been terminated when a cancel signal is input after a contact signal is continuously input.

The control part 103 determines the positional relationship (distance L and angle R) between the contact starting point SP and the swipe point MP from the coordinates of the contact starting point SP and the swipe point MP and then generates a control command C according to the determined result. The control part 103 then controls the communication part 107 to transmit the generated control command C to the television 10.

The control part 103 sets a first direction from the positional relationship between the contact starting point SP and a first swipe point MP1 and generates a control command C1 indicating start of the swipe in the first direction. The control part 103 also sets a second direction from the positional relationship between the contact starting point SP and a second swipe point MP2, and generates a control command C2 indicating stop of the swipe in the first direction and start of the swipe in the second direction in the case where the second direction differs from the first direction.

Further, the control part 103 calculates a first distance L1 between the contact starting point SP and the first swipe point MP1, and a second distance L2 between the contact starting point SP and the second swipe point MP2. The control part 103 generates a control command C3 indicating stop of the swipe in the case where the difference $\Delta L$ between the first distance L1 and the second distance L2 is equal to or larger than a predetermined threshold LT.

[3. Remote Control Process]

Figure 4:
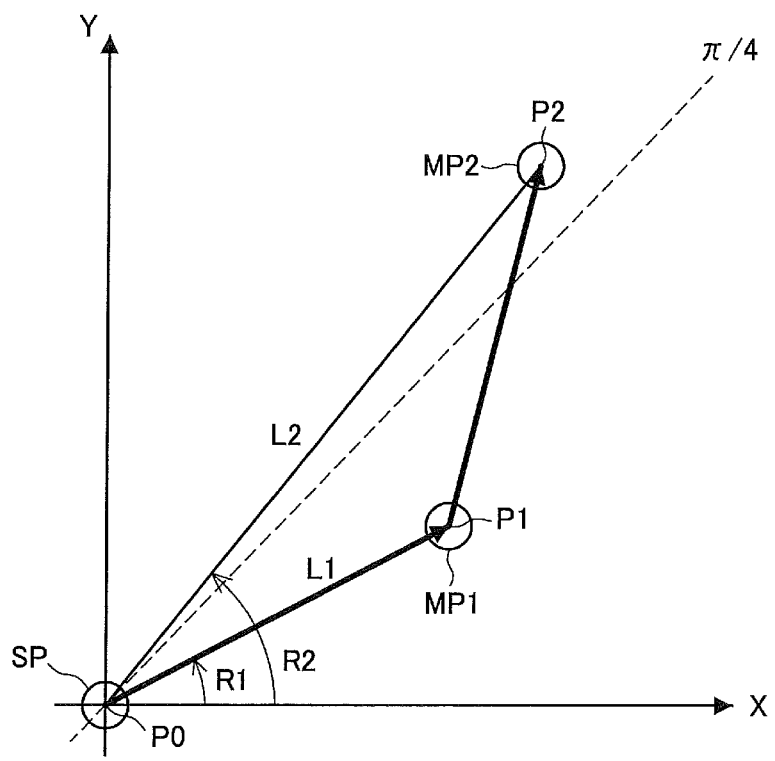
FIG. 4 is an illustration of a parameter defining a swipe and hold control.
Figure 6:
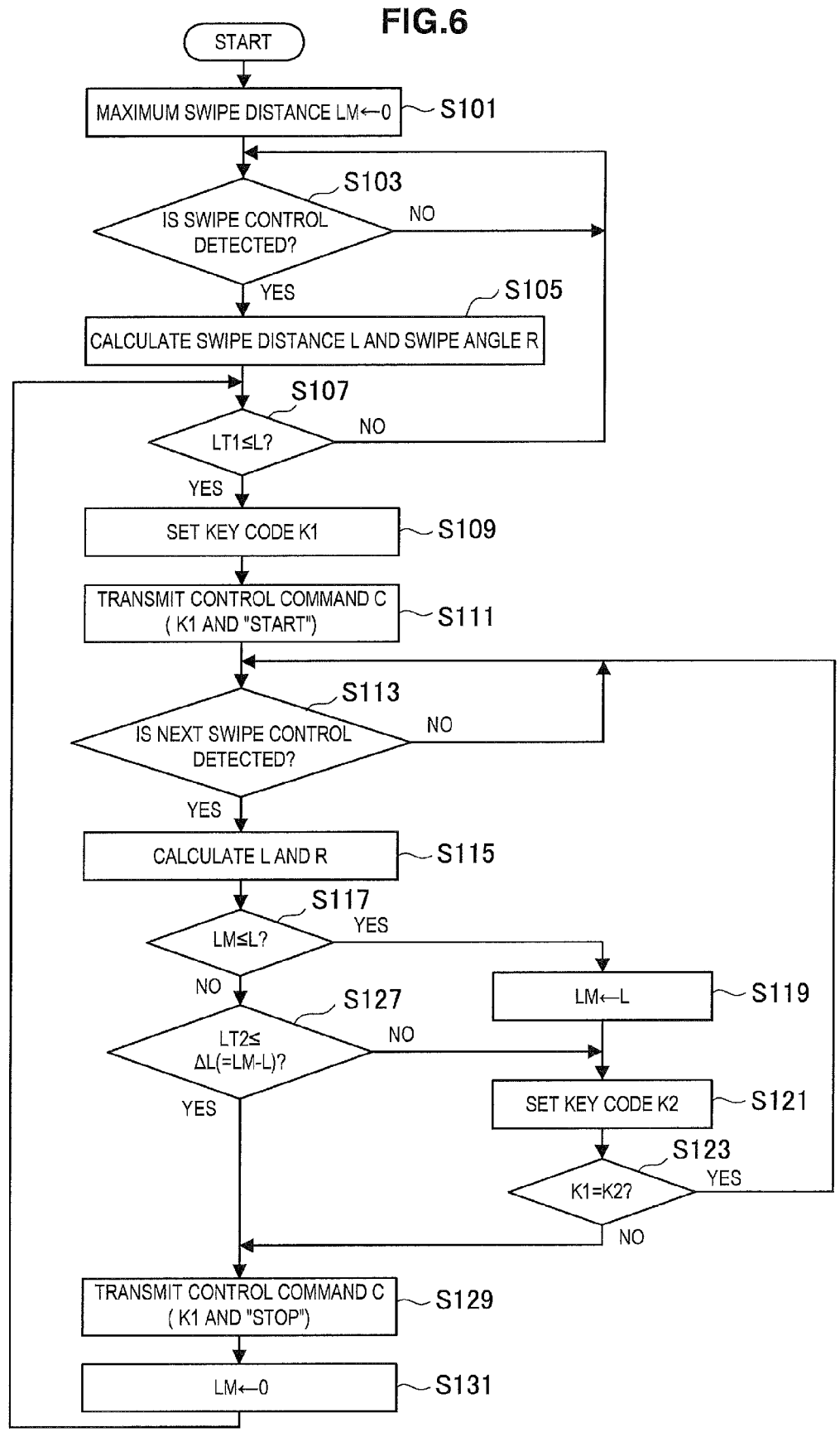
FIG. 6 is a flowchart showing the steps of a remote control process.
Figure 7:
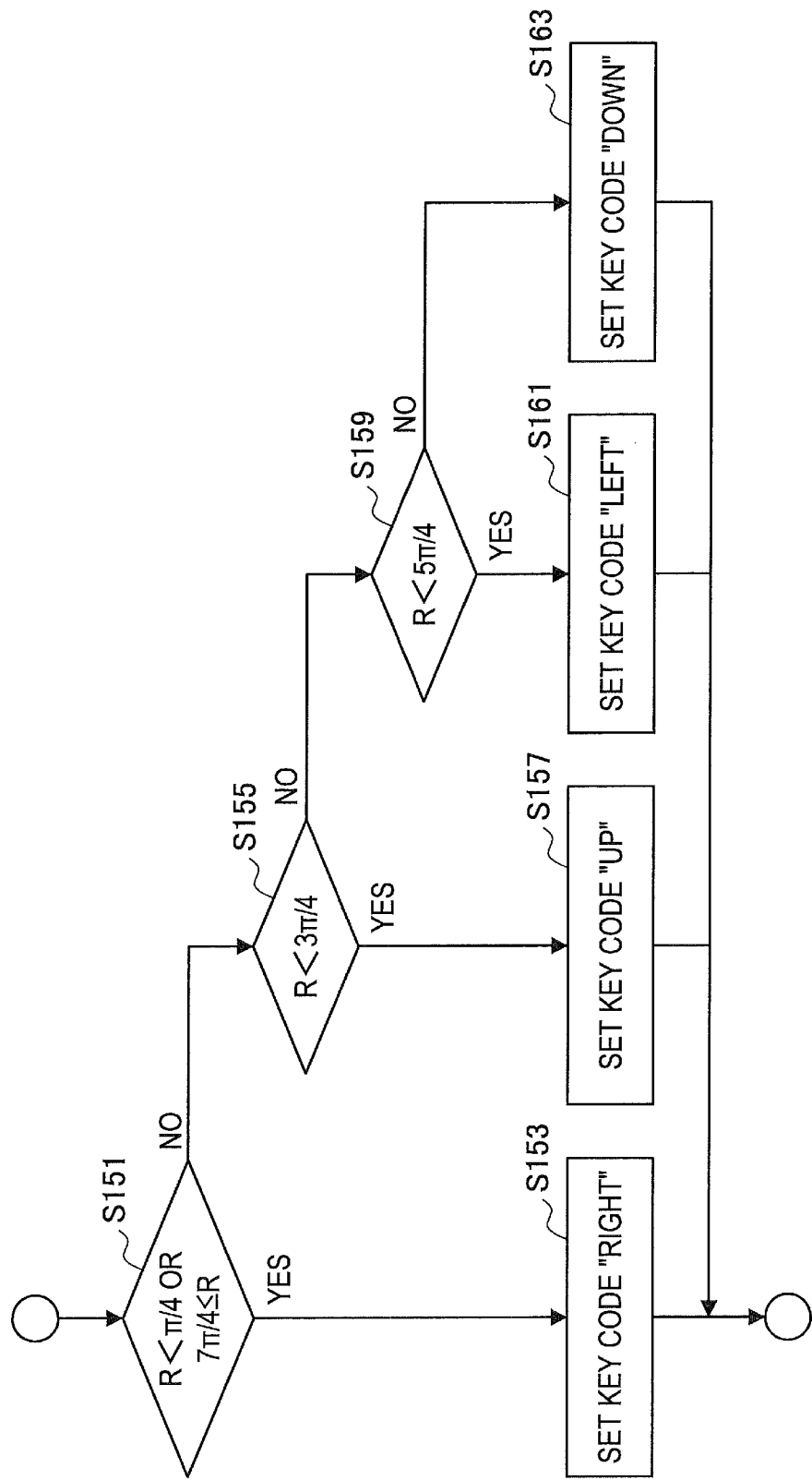
FIG. 7 is a flowchart showing standards for determining key codes.
Figure 8A:
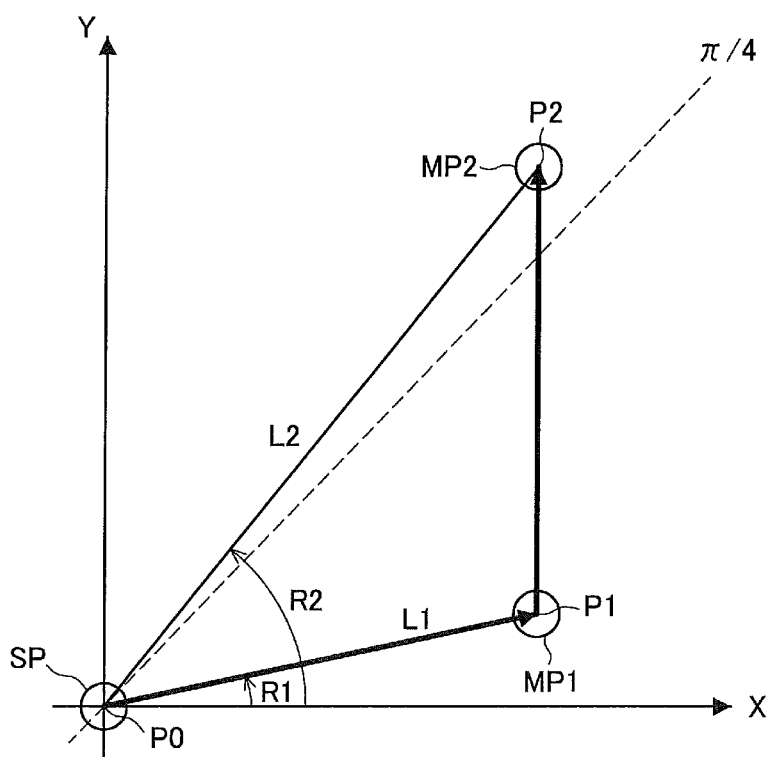
FIG. 8A is an illustration describing a remote control process.
Figure 8B:
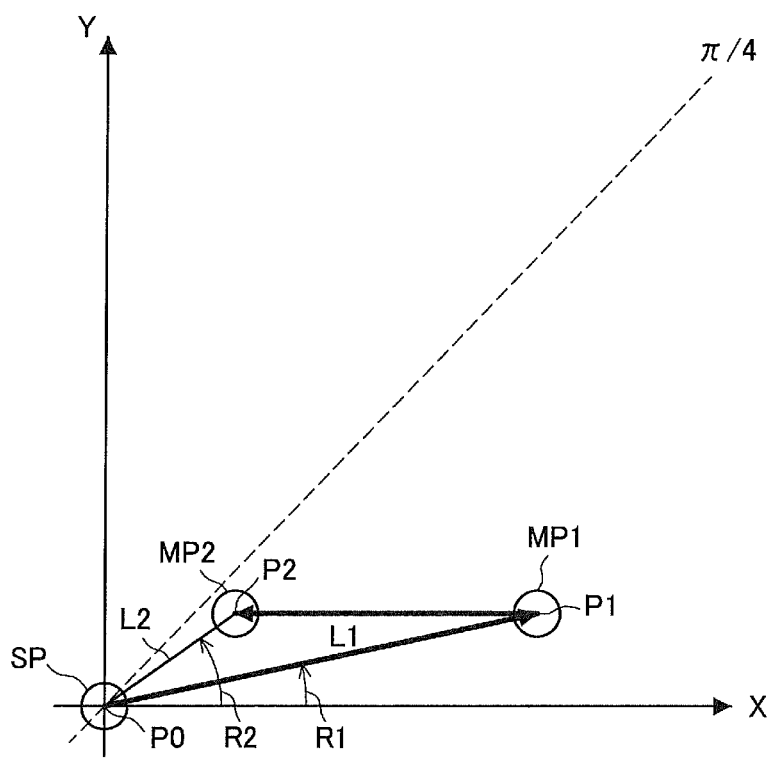
FIG. 8B is an illustration describing a remote control process.
Figure 8C:
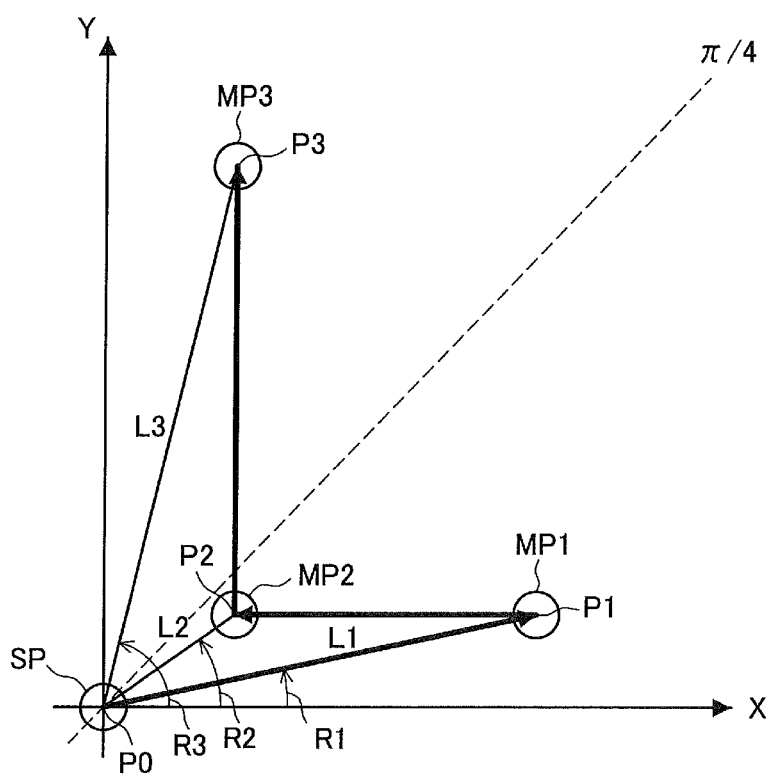
FIG. 8C is an illustration describing a remote control process.

Next, the remote control process of the television 10 using the above-mentioned commander 100 will be described with reference to FIGS. 4 to 8. FIG. 4 is an illustration of a parameter defining a swipe and hold control. FIG. 5 is a table showing a control command C generated in response to a swipe and hold control. FIG. 6 is a flowchart showing the steps of a remote control process. FIG. 7 is a flowchart showing the standards for determining key codes. FIGS. 8A to 8C are illustrations describing remote control processes.

As described above, the commander 100 remotely controls the television 10 in response to a swipe and hold control. As shown in FIG. 4, the swipe and hold control is defined by each parameter of a normal coordinate P0, swipe coordinates P1, P2 . . . , swipe distances L1, L2 . . . , and swipe angles R1, R2 . . . .

Here, the normal coordinate P0 denotes the central coordinate of a contact starting point SP where the finger P has first touched in the touch panel 101a in a swipe and hold control. The swipe coordinates P1, P2 . . . denote the central coordinate of a swipe point MP1 where the finger P has been swiped from the contact starting point SP and held while touching the touch panel 101a or the central coordinate of a next swipe point MP2 where the finger P has been swiped from the swipe point MP1 and held. The swipe distances L1, L2 . . . and the swipe angles R1, R2 . . . denote the scalar value of a vector connecting the contact starting point SP with each of the swipe points MP1, MP2 . . . , and its vector angle, respectively.

For example, it is assumed that the finger P is swiped from the contact starting point SP to the first swipe point MP1 and the second swipe point MP2 in a swipe and hold control. In this case, the normal coordinate P0 is defined as the coordinate of the contact starting point SP. The swipe coordinates P1 and P2 are defined as the coordinates of the first swipe point MP1 and the second swipe point MP2. The swipe distances L1 and L2 and swipe angles R1 and R2 of the first swipe point MP1 and the second swipe point MP2 are calculated as the scalar value of a vector connecting the contact starting point SP with each of the swipe points MP1 and MP2 and its vector angle. Note that the swipe angles R1 and R2 are represented in radians.

As described above, the commander 100 generates a control command C in response to a swipe and hold control. As shown in FIG. 5, the control command C includes information such as a key code, a control code, and a strength parameter I. The key code is a piece of information designating a swipe direction. The control code is a code such as a "start" code indicating start of the swipe according to the key code, a "stop" code indicating stop of the swipe, a "continuation" code indicating continuation of the swipe. The strength parameter I is a parameter indicating the speed, the acceleration and the like of the swipe according to the key code.

The commander 100 remotely controls the television 10 according to the processing steps shown in FIG. 6. Note that the remote control process is performed when the finger P's contact with the touch panel 101a is detected.

At the start of the remote control process, the control part 103 initializes the maximum swipe distance LM or, in other words, substitutes zero into the LM (step S101). The maximum swipe distance LM is used for determining the instruction to stop the swipe, as described below.

The control part 103 determines whether the user inputs a swipe control (S103). When a swipe control is detected, the control part 103 calculates the swipe distance L and the swipe angle R (S105). The control part 103 determines whether the swipe distance L is equal to or larger than a predetermined first threshold LT1 (S107). The first threshold LT1 is used for determining whether the detected swipe control is effective. Then, the control part 103 performs the next process when the swipe distance L is equal to or larger than the first threshold LT1. When the swipe distance L is less than the first threshold LT1, the control part 103 returns to the process in step S103.

When the swipe distance L is equal to or larger than the first threshold LT1 at the process in step S107, the control part 103 sets a key code K1 corresponding to the swipe angle R, according to the standards for determining shown in FIG. 7 (S109). Then, the control part 103 controls the communication part 107 to transmit the control command C including the key code K1 and the control code "start" to the television 10 (S111). The television 10 starts a swiping process in a direction corresponding to the key code in response to the control command C.

In the standards for determining shown in FIG. 7, when the swipe angle R satisfies $R<\pi/4$ or $7\pi/4 \leq R$ (S151), a key code "right" is set (S153). When the swipe angle R satisfies $\pi/4 \leq R<3\pi/4$ (S155), a key code "up" is set (S157). When the swipe angle R satisfies $3\pi/4 \leq R<5\pi/4$ (S159), a key code "left" is set (S161). In other cases than the above, namely, when the swipe angle R satisfies $5\pi/4 \leq R<7\pi/4$, a key code "down" is set (S163). Note that the standards for determining a key code are not limited to the above-mentioned examples. For example, the setting of the key code "up" and that of the key code "down" can be reversed and also the setting of the key code "left" and that of the key code "right" can be reversed.

After transmitting the control command C, the control part 103 determines whether the user inputs a next swipe control (S113). When a next swipe control is detected, the control part 103 calculates the swipe distance L and the swipe angle R (S115). Note that the control part 103 controls the communication part 107 to transmit a control command C including a key code K1 and the control code "stop" to the television 10 if a cancellation of the contact (cancel signal) is detected instead of the next swipe control. The television 10 stops a swiping process in response to the control command C.

After calculating the swipe distance L and the swipe angle R, the control part 103 determines whether the swipe distance L is equal to or larger than the maximum swipe distance LM (S117). Then, the control part 103 performs the process in step S119 when the swipe distance L is equal to or larger than the maximum swipe distance LM. When the swipe distance L is less than the maximum swipe distance LM, the control part 103 performs the process in step S127. Note that the swipe distance L equal to or larger than the maximum swipe distance LM denotes that a swipe control to move away from the contact starting point SP is input. The swipe distance L less than the maximum swipe distance LM denotes that a swipe control to approach the contact starting point SP is input.

When the swipe distance L is equal to or larger than the maximum swipe distance LM at the process in step S117, the control part 103 substitutes the swipe distance L into the maximum swipe distance LM or, in other words, updates the maximum swipe distance LM with the swipe distance L (S119). Next, the control part 103 sets a key code K2 corresponding to the swipe angle R, according to the standards for determining shown in FIG. 7 in the same way as the process in step S109 (S121).

Then, the control part 103 determines whether the key code K1 corresponds with the key code K2 (S123). When the key code K1 corresponds with the key code K2, the control part 103 returns to the process in step S113. When the key code K1 does not correspond with the key code K2, the control part 103 performs the process in step S129. Note that the key code K1 that corresponds with the key code K2 denotes that the swipe control is determined to be a control in the same direction as the previous swipe control. The key code K1 that does not correspond with the key code K2 denotes that the swipe control is determined to be a control in the different direction from the previous swipe control.

On the other hand, when the swipe distance L is less than the maximum swipe distance LM at the process in step S117, the control part 103 determines whether the difference $\Delta L$ (=LM−L) between the swipe distance L and the maximum swipe distance LM is equal to or larger than a predetermined second threshold LT2 (S127). The second threshold LT2 is used for determining the instruction to stop the swipe. When the difference $\Delta L$ is equal to or larger than the second threshold LT2, the control part 103 performs the next process. When the difference $\Delta L$ is less than the second threshold LT2, the control part 103 performs the process in step S121. Note that the difference $\Delta L$ equal to or larger than the second threshold LT2 denotes that the swipe control is determined to be a control to cancel the previous swipe control.

When the key code K1 does not correspond with the key code K2 at the process in step S123 or when the difference $\Delta L$ is equal to or larger than the second threshold LT2 at the process in step S127, the control part 103 controls the communication part 107 to transmit a control command C including the key code K1 and the control code "stop" to the television 10 (S129). The television 10 stops the swiping process in response to the control command C. Next, the control part 103 initializes the maximum swipe distance LM (S131). The control part 103 returns to the process in step S107 and determines whether the swipe distance L that has been calculated at the process in step S115 is equal to or larger than the first threshold LT1.

FIGS. 8A to 8C show specific examples of a swipe and hold control designating an arbitrary predetermined contact starting point SP.

In the example shown in FIG. 8A, a swipe and hold control is performed to continuously swipe the finger P (not shown) from the contact starting point SP through the first swipe point MP1 to the second swipe point MP2. In the example shown in FIG. 8A, the swipe from the first swipe point MP1 to the second swipe point MP2 instructs to change the swipe direction.

The swipe distance L1 is equal to or larger than the first threshold LT1 and the swipe angle R1 satisfies $R1<\pi/4$ at the first swipe point MP1 so that the key code "right" is set as the key code K1. Accordingly, the commander 100 transmits a control command C including the key code "right" and the control code "start" to the television 10. The television 10, for example, starts swiping the cursor CU in a right direction on the display 11 in response to the control command C.

The swipe distance L2 is equal to or larger than the maximum swipe distance LM at the second swipe point MP2 so that the maximum swipe distance LM is updated with the swipe distance L2. Also, the swipe angle R2 satisfies $\pi/4 \leq R2 < 3\pi/4$ so that the key code "up", namely, a different key code from the key code K1 is set as the key code K2. Accordingly, the commander 100 transmits a control command C including the key code "right" and the control code "stop" to the television 10. The television 10 stops swiping the cursor CU in the right direction in response to the control command C. Further, the maximum swipe distance LM is initialized with the change of the swipe direction.

The swipe distance L2 is equal to or larger than the first threshold LT1 and the swipe angle R2 is $\pi/4 \leq R2 < 3\pi/4$ so that the key code "up" is set as the key code K1. Accordingly, the commander 100 transmits a control command C including the key code "up" and the control code "start" to the television 10. The television 10 starts swiping the cursor CU in an upward direction instead of in the right direction, in response to the control command C.

When the cancellation of the contact is detected, the commander 100 transmits a control command C including the key code "up" and the control code "stop" to the television 10. The television 10 stops swiping the cursor CU in the upward direction, in response to the control command C.

In the example shown in FIG. 8B, a swipe and hold control is performed to continuously swipe the finger P from the contact starting point SP through the first swipe point MP1 to the second swipe point MP2. In the example shown in FIG. 8B, the swipe from the first swipe point MP1 to the second swipe point MP2 instructs to stop the swipe.

The commander 100 transmits a control command C including the key code "right" and the control code "start" to the television 10 at the first swipe point MP1. The television 10 starts swiping the cursor CU in a right direction on the display 11 in response to the control command C.

It is assumed that the swipe distance L2 is less than the maximum swipe distance LM and the difference $\Delta L$ (LM−L2) between the maximum swipe distance LM and the swipe distance L2 is calculated as a value equal to or larger than the second threshold LT2 at the second swipe point MP2. In this case, the commander 100 transmits a control command C including the key code "right" and the control code "stop" to the television 10. The television 10 stops swiping the cursor CU in the right direction, in response to the control command C. Further, the maximum swipe distance LM is initialized with the stop of the swipe.

Then, it is assumed that the swipe distance L2 calculated at the second swipe point MP2 is less than the first threshold LT1. In this case, the commander 100 does not transmit a control command C to the television 10. Accordingly, the television 10 maintains stopping the swipe of the cursor CU. When the cancellation of the contact is detected, the commander 100 terminates the remote control process.

Note that the swipe angle R2 satisfies $R2<\pi/4$ when the swipe distance L2 calculated at the second swipe point MP2 is equal to or larger than the first threshold LT1 so that the key code "right" is set as the key code K1. Accordingly, the commander 100 transmits a control command C including the key code "right" and the control code "start" to the television 10. The television 10 starts swiping the cursor CU in a right direction in response to the control command C.

In the example shown in FIG. 8C, a swipe and hold control is performed to continuously swipe the finger P from the contact starting point SP through the first swipe point MP1 and the second swipe point MP2 to the third swipe point MP3. In the example shown in FIG. 8C, the swipe from the second swipe point MP2 to the third swipe point MP3 instructs to resume the swipe.

At the first swipe point MP1, the commander 100 transmits a control command C including the key code "right" and the control code "start" to the television 10. The television 10 starts swiping the cursor CU in a right direction in response to the control command C.

At a second swipe coordinate, the commander 100 transmits a control command C including the key code "right" and the control code "stop" to the television 10. The television 10 stops swiping the cursor CU in the right direction in response to the control command C.

Then, it is assumed that the swipe distance L2 calculated at the second swipe point MP2 is less than the first threshold LT1. In this case, the commander 100 does not transmit a control command C to the television 10. Accordingly, the television 10 maintains stopping the swipe of the cursor CU.

Next, the swipe distance L3 is equal to or larger than the maximum swipe distance LM and the swipe angle R3 satisfies $\pi/4 \leq R3 < 3\pi/4$ so that the key code "up" is set as the key code K1 at the third swipe point MP3. Accordingly, the commander 100 transmits a control command C including the key code "up" and the control code "start" to the television 10. The television 10 starts swiping the cursor CU in an upward direction in response to the control command C.

[4. Exemplary Variation of Remote Control Process]

Figure 9:
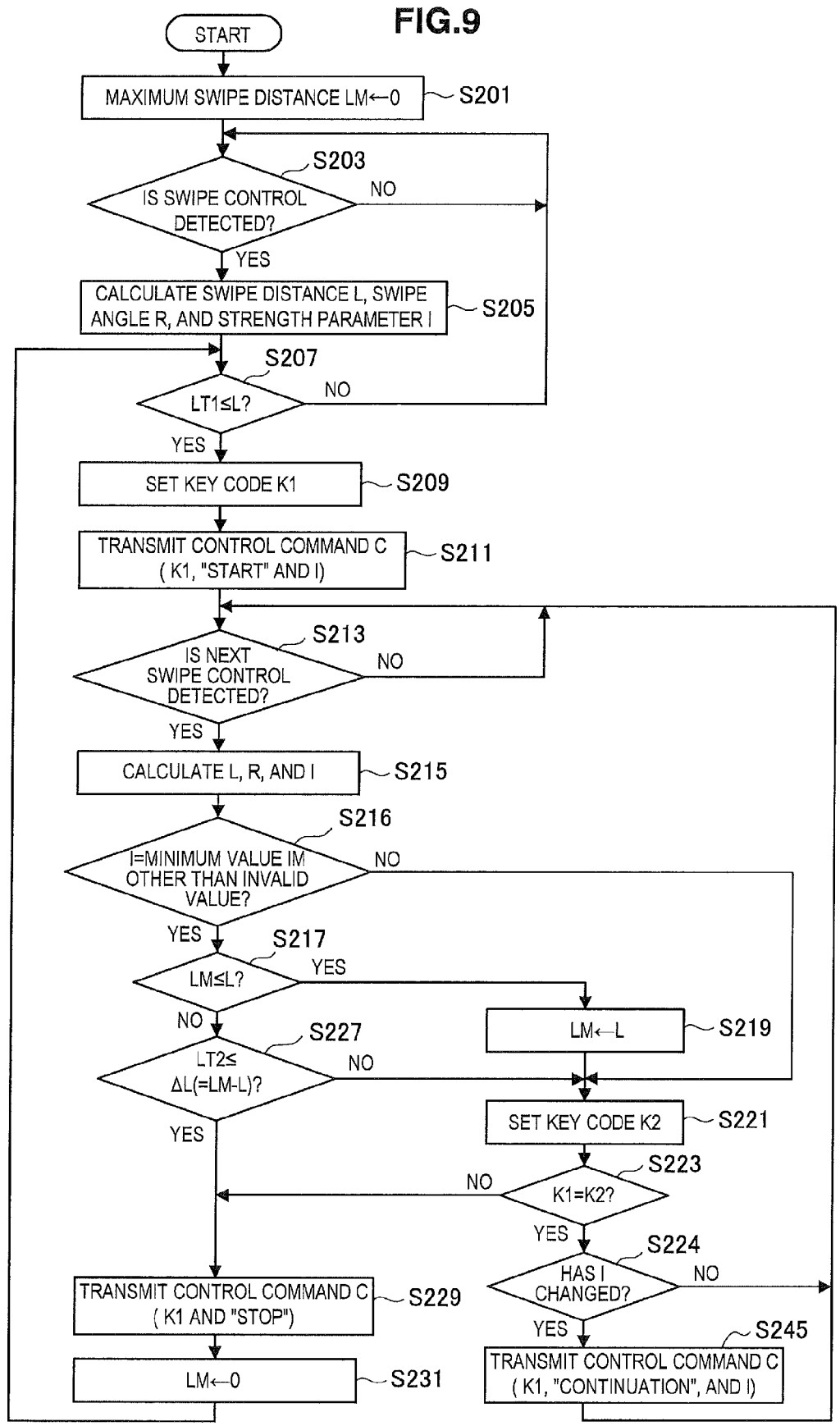
FIG. 9 is a flowchart showing an exemplary variation of the steps of the remote control process.

Next, an exemplary variation of a remote control process of the television 10 through the above-mentioned commander 100 will be described with reference to FIG. 9. FIG. 9 is a flowchart showing an exemplary variation of the steps of the remote control process. Note that the description overlapping with the remote control process shown in FIG. 6 will be omitted below.

In the exemplary variation of the remote control process shown in FIG. 9, a strength parameter I according to the swipe distance L is used as a parameter defining a swipe and hold control. The strength parameter I is set as a value or the like that is proportional to the swipe distance L to instruct the swipe speed, the acceleration or the like.

When a swipe control and the next swipe control are detected at the processes in steps S205 and S215, the control part 103 calculates the strength parameter I together with the swipe distance L and the swipe angle R.

At the process in step S211, the control part 103 controls the communication part 107 to transmit a control command C including the strength parameter I together with the key code K1 and the control code "start" to the television 10. The television 10 starts a swiping process in a direction corresponding to the key code, in response to the control command C. In this case, the larger the value of the strength parameter I, the faster the swipe speed in a direction corresponding to the key code.

At the process in step S216, the control part 103 determines whether the value (absolute value) of the strength parameter I is a minimum value IM other than an invalid value (e.g., value=0). In this case, the control part 103 performs the next step when the value of the strength parameter I is a minimum value IM, and performs the process in step S221 when the value of the strength parameter I is not a minimum value IM. Note that the value of the strength parameter I that equals a minimum value IM other than an invalid value denotes that the stop of the swipe has been possibly instructed. The value of the strength parameter I that does not equal a minimum value IM other than an invalid value denotes that the stop of the swipe could not have been instructed.

When the key code K1 corresponds with the key code K2, the control part 103 determines whether the strength parameter I calculated in step S205 is a value different from the strength parameter I calculated in step S215 at the process in step S224. Then, the control part 103 performs the next process when the values are different from each other, and returns to the process in step S213 when the values are equal to each other.

At the process in step S245, the control part 103 transmits a control command C including the strength parameter I together with the key code K1 and the control code "continuation" to the television 10. This means that the updated value of the strength parameter I is transmitted. The television 10 continues the swiping process in a direction corresponding to the key code at a speed according to the updated strength parameter I, in response to the control command C.

Note that, when using the strength parameter I, the control part 103 can control the communication part 107 to transmit a control command C including a value other than an invalid value and an invalid value as the strength parameter I in place of the control codes "start" and "stop", respectively to the television 10. Then, the television 10 starts a swiping process in a direction corresponding to the key code when recognizing a value other than an invalid value, and stops the swiping process in a direction corresponding to the key code when recognizing an invalid value.

Also, when using the strength parameter I, the control part 103 can control the communication part 107 to transmit a control command C including the strength parameter I in place of the key code to the television 10. In this case, the strength parameter I is set, for example, as a positive value when the control command C is in an upward direction, and as a negative value when the control command C is in a downward direction. Accordingly, the television 10 starts an upward swipe when recognizing the positive value, and starts a downward swipe when recognizing the negative value.

[5. Conclusion]

As described above, the commander 100 according to the embodiments of the present invention finds a first direction from the positional relationship between the contact starting point SP and the first swipe point MP1 and transmits a control command C1 indicating start of the swipe in the first direction. Then, a second direction is found from the positional relationship between the contact starting point SP and the second swipe point MP2, and a control command C2 indicating stop of the swipe in the first direction and start of the swipe in the second direction is transmitted in the case where the second direction differs from the first direction. Accordingly, the swipe direction can be changed without a temporary cancellation of the contact so that the operability of the swipe and hold control can be increased.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the case in which a control command C including a single key code is transmitted has been described above. However, the control command C can include a plurality of key codes such as key codes "up" and "right". In this case, a swiping process in a diagonal direction such as upper right is performed in the television 10.

Further, the case in which the swipe distance L is calculated as the scalar value of the vector connecting the contact starting point SP with the swipe point MP has been described above. However, the swipe distance L can be calculated as the cosine value or sine value of the vector.

Furthermore, in the above description, any other control command C is not transmitted between a control command including the control code "start" and a control command C including the control code "stop". However, a control command C' including the control code "continuation" can be regularly transmitted between transmitting both of the control commands C. Thus, in the case where a trouble occurs at an interval between transmitting both of the control commands C, the television 10 can stop the swipe control when not receiving the control command C' including the control code "continuation".

Furthermore, the case in which the cursor CU is swiped on the display in response to the swipe and hold control has been described above. However, in response to the swipe and hold control, the played content can be, for example, fast-forwarded/rewound and the displayed content can be, for example, switched.

REFERENCE SIGNS LIST

10 Television
100 Commander
101 Touch panel display
101a Touch panel
SP Contact starting point
MP1, MP2, and MP3 Swipe point
L1, L2, and L3 Swap distance
R1, R2, and R3 Swap angle

The invention claimed is:
1. A remote control apparatus comprising:
a display panel;
a control detecting part for detecting a swipe of a contact point by a continuous contact control to the display panel;
a command generating part for finding a first direction from a positional relationship between a contact starting point and a first swipe point swiped from the contact starting point, generating a control command indicating start of a swipe in the first direction, finding a second direction from a positional relationship between the contact starting point and a second swipe point swiped from the first swipe point, and generating a control command indicating stop of the swipe in the first direction and start of a swipe in the second direction in the case where the second direction differs from the first direction; and
a command transmitting part for transmitting the generated control command to an electronic device, wherein the command generating part finds a first distance between the contact starting point and the first swipe point and a second distance between the contact starting point and the second swipe point, and generates a control command indicating stop of a swipe when a difference between the first distance and the second distance is equal to or larger than a predetermined threshold.

2. The remote control apparatus according to claim 1, wherein the command generating part finds a distance between the contact starting point and a swipe point, and generates the control command indicating start of the swipe in the case where the found distance is equal to or larger than another predetermined threshold.

3. The remote control apparatus according to claim 1, wherein the command generating part generates a control command indicating continuation of the swipe until the control command indicating stop of the swipe is transmitted after the control command indicating start of the swipe is transmitted.

4. The remote control apparatus according to claim 1, wherein the command generating part generates the control command indicating stop of the swipe in the case where a contact point is not detected after the control command indicating start of the swipe is transmitted to the electronic device.

5. The remote control apparatus according to claim 1, wherein the control command includes information set according to the distance between the contact starting point and the swipe point and indicating a swipe speed.

6. The remote control apparatus according to claim 1, wherein the control command is used for swiping an object to be swiped displayed on the electronic device.

7. A remote control system comprising:
a remote control apparatus; and
an electronic device remotely controlled by the remote control apparatus, wherein the remote control apparatus includes
  a display panel,
  a control detecting part for detecting a swipe of a contact point by a continuous contact control to the display panel,
  a command generating part for finding a first direction from a positional relationship between a contact starting point and a first swipe point swiped from the contact starting point, generating a control command indicating start of a swipe in the first direction, finding a second direction from a positional relationship between the contact starting point and a second swipe point swiped from the first swipe point, and generating a control command indicating stop of the swipe in the first direction and start of a swipe in the second direction in the case where the second direction differs from the first direction, and
  a command transmitting part for transmitting the generated control command to the electronic device,
  wherein the command generating part finds a first distance between the contact starting point and the first swipe point and a second distance between the contact starting point and the second swipe point, and generates a control command indicating stop of a swipe when a difference between the first distance and the second distance is equal to or larger than a predetermined threshold.

8. A remote control method comprising:
detecting a swipe of a contact point by a continuous contact control to a display panel;
finding a first direction from a positional relationship between a contact starting point and a first swipe point swiped from the contact starting point, and generating and transmitting, to an electronic device, a control command indicating start of a swipe in the first direction;
finding a second direction from a positional relationship between the contact starting point and a second swipe point swiped from the first swipe point, and generating and transmitting, to the electronic device, a control command indicating stop of the swipe in the first direction and start of a swipe in the second direction in the case where the second direction differs from the first direction;
finding a first distance between the contact starting point and the first swipe point and a second distance between the contact starting point and the second swipe point; and
generating a control command indicating stop of a swipe when a difference between the first distance and the second distance is equal to or larger than a predetermined threshold.

9. A non-transitory computer readable recording medium having stored thereon a program for causing a computer to implement a remote control method comprising:
detecting a swipe of a contact point by a continuous contact control to a display panel;
finding a first direction from a positional relationship between a contact starting point and a first swipe point swiped from the contact starting point, and generating and transmitting, to an electronic device, a control command indicating start of a swipe in the first direction; and
finding a second direction from a positional relationship between the contact starting point and a second swipe point swiped from the first swipe point, and generating and transmitting, to the electronic device, a control command indicating stop of the swipe in the first direction and start of a swipe in the second direction in the case where the second direction differs from the first direction;
finding a first distance between the contact starting point and the first swipe point and a second distance between the contact starting point and the second swipe point; and
generating a control command indicating stop of a swipe when a difference between the first distance and the second distance is equal to or larger than a predetermined threshold.

* * * * *